(12) United States Patent
Morisaki et al.

(10) Patent No.: US 11,779,447 B2
(45) Date of Patent: Oct. 10, 2023

(54) DEMONSTRATION INSTRUMENT

(71) Applicant: TOKUYAMA DENTAL CORPORATION, Tokyo (JP)

(72) Inventors: Hiroshi Morisaki, Tokyo (JP); Naoto Shiohira, Tokyo (JP)

(73) Assignee: Tokuyama Dental Corporation, Tokyo (JP)

( * ) Notice: Subject to any disclaimer, the term of this patent is extended or adjusted under 35 U.S.C. 154(b) by 317 days.

(21) Appl. No.: 17/056,665

(22) PCT Filed: May 31, 2019

(86) PCT No.: PCT/JP2019/021730
§ 371 (c)(1),
(2) Date: Nov. 18, 2020

(87) PCT Pub. No.: WO2019/235379
PCT Pub. Date: Dec. 12, 2019

(65) Prior Publication Data
US 2021/0205062 A1    Jul. 8, 2021

(30) Foreign Application Priority Data
Jun. 7, 2018 (JP) .................. 2018-109710

(51) Int. Cl.
*A61C 19/10*       (2006.01)
*A61C 13/087*      (2006.01)
*G09B 23/28*       (2006.01)

(52) U.S. Cl.
CPC ............ *A61C 19/10* (2013.01); *A61C 13/087* (2013.01); *G09B 23/283* (2013.01); *A61C 2201/002* (2013.01)

(58) Field of Classification Search
CPC .................................................. A61C 19/10
See application file for complete search history.

(56) References Cited

U.S. PATENT DOCUMENTS 1,048,382 A * 12/1912 Allen ................. G09B 23/283
                                                434/263
2,792,628 A *  5/1957 Neumayer .......... A61C 13/082
                                                433/206
(Continued)

FOREIGN PATENT DOCUMENTS

CA      2 373 891 A1    9/2002
CN        1607926 A     4/2005
(Continued)

OTHER PUBLICATIONS

Supplementary European Search Report dated Feb. 11, 2022 in European Application No. 19814178.0.
(Continued)

*Primary Examiner* — Heidi M Eide
(74) *Attorney, Agent, or Firm* — Saliwanchik, Lloyd & Eisenschenk

(57) ABSTRACT

[Object] To provide, for a composite resin (CR) having a wide range of applicable colors (shades) (wide-ranging color applicable CR), such as a CR having light diffusion properties and a CR that produces color by means of a structural color, a technology with which an excellent effect, specifically, an increased breadth (number) of applicable shades in comparison to an existing CR other than a wide-ranging color applicable CR, can be achieved.
[Solving Means] For example, in a demonstration instrument, a plurality of samples is prepared, a single wide-ranging color applicable CR has been used to restore a cavity in artificial teeth each having a different shade, the cavity being formed at a predetermined position of the artificial teeth, and the plurality of samples is disposed side by side and fixed on a display surface of a display plate, thereby making it possible to compare/contrast conditions of
(Continued)

restored portions of the samples to each other and the color tone applicability thereof to those of a teeth to be restored.

7 Claims, 2 Drawing Sheets

(56) References Cited

U.S. PATENT DOCUMENTS

| | | | |
|---|---|---|---|
| 5,419,784 | A | 5/1995 | Tsukaguchi |
| 5,989,022 | A | 11/1999 | Yamamoto et al. |
| 6,196,843 | B1 | 3/2001 | Kawaguchi et al. |
| 2003/0125189 | A1 | 7/2003 | Castro et al. |
| 2004/0067477 | A1* | 4/2004 | Marshall ............. G09B 23/283 434/263 |
| 2007/0298381 | A1 | 12/2007 | Collodoro |
| 2008/0026353 | A1* | 1/2008 | Chyz ................... G09B 23/283 434/263 |
| 2008/0153054 | A1 | 6/2008 | Masters et al. |
| 2008/0213731 | A1 | 9/2008 | Fishburne |
| 2008/0217190 | A1 | 9/2008 | Matsushige et al. |
| 2009/0324072 | A1 | 12/2009 | Ikeda |
| 2010/0221683 | A1 | 9/2010 | Franke et al. |
| 2011/0129796 | A1 | 6/2011 | Riggio |
| 2012/0006709 | A1 | 1/2012 | Matsushige et al. |
| 2015/0272704 | A1 | 10/2015 | Watson et al. |
| 2015/0272705 | A1 | 10/2015 | Watson et al. |
| 2016/0262860 | A1 | 9/2016 | Korten et al. |
| 2019/0314114 | A1 | 10/2019 | Watson |

FOREIGN PATENT DOCUMENTS

| | | |
|---|---|---|
| CN | 100998522 A | 7/2007 |
| CN | 101466327 A | 6/2009 |
| CN | 101582213 A | 11/2009 |
| CN | 101626739 A | 1/2010 |
| CN | 101778807 A | 7/2010 |
| CN | 102078223 A | 6/2011 |
| CN | 102098980 A | 6/2011 |
| CN | 102275672 A | 12/2011 |
| CN | 204709027 U | 10/2015 |
| CN | 107653395 A | 2/2018 |
| EP | 1 243 233 A1 | 9/2002 |
| JP | 5-332839 A | 12/1993 |
| JP | 11-335221 A | 12/1999 |
| JP | 2001-149385 A | 6/2001 |
| JP | 2012-50745 A | 3/2012 |
| JP | 4895443 B2 | 3/2012 |
| JP | 2014-161440 A | 9/2014 |
| JP | 2014-161440 A | 9/2014 |
| JP | 6004769 B2 | 9/2016 |
| JP | 6250245 B2 | 12/2017 |
| TW | 201634012 A | 10/2016 |
| WO | 2004/037112 A1 | 5/2004 |
| WO | 2008/008598 A2 | 1/2008 |
| WO | 2014/202484 A1 | 12/2014 |
| WO | WO-2016/080281 A1 | 5/2016 |

OTHER PUBLICATIONS

Office Action dated Jan. 12, 2022 in Chinese Application No. 201980037233.X.
International Search Report in International Application No. PCT/JP2019/021730, filed Dec. 7, 2020.
Written Opinion dated Jun. 23, 2020 in International Application No. PCT/JP2019/021730.
YouTube [video], Apr. 24, 2015, [online], [Feb. 20, 2020], <URL:https://www.youtube.com/watch?v=w0ldYhk3MvA&feature=youtu.be>.
Mar. 2016, [Online], [Feb. 20, 2020], <URL:https://www.shofu.co.jp/product/core_sys/images/main/seihin/sikan/pdf/beautifil_bulk/beautifil_bulk_flowable_2.pdf>.

* cited by examiner

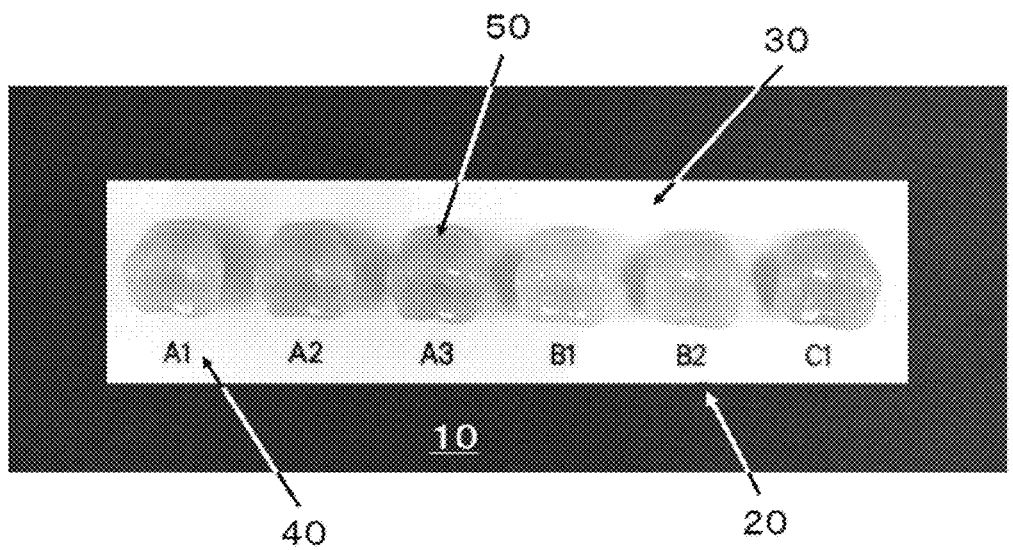
FIG.1
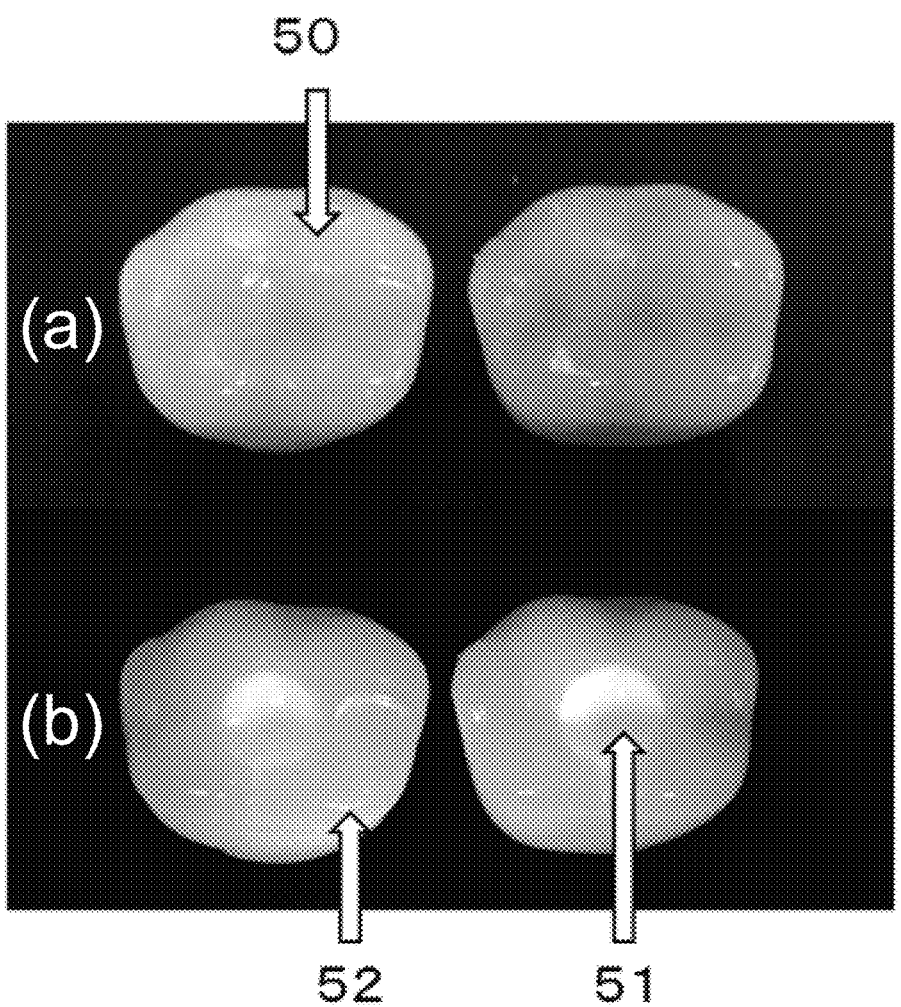
FIG.2A
FIG.2B

US 11,779,447 B2

DEMONSTRATION INSTRUMENT

CROSS-REFERENCE TO RELATED APPLICATIONS

This application is the U.S. national stage application of International Patent Application No. PCT/JP2019/021730, filed May 31, 2019, which claims the benefit under 35 U.S.C. § 119 of Japanese Application No. 2018-109710, filed Jun. 7, 2018, the disclosures of each of which are incorporated herein by reference in their entirety.

TECHNICAL FIELD

The present invention relates to a demonstration instrument for comparing a tooth restoration condition by a composite resin.

BACKGROUND ART

A dental composite resin (hereinafter, referred to simply as "CR") is a type of material used to restore teeth damaged by caries or fractures, and contains a curable composition including a polymerizable monomer and an inorganic and/or organic filler. The restoration (CR restoration) using a dental composite resin (CR) is rapidly becoming popular because it is capable of reducing the amount of the tooth substance to be shaved down, and imparting a color tone equivalent to a natural tooth color, and is easy to operate. Further, in recent years, from the viewpoint of improving the mechanical strength and adhesiveness with teeth, the CR is used for the restoration of not only the anterior tooth portion but also the molar portion to which a high occlusal pressure is applied.

As described above, the ability to make a highly aesthetic restoration is one of the excellent features of CR restoration. In order to achieve a highly aesthetic restoration, it is necessary to determine the color (hue and a color tone) of a tooth to be restored (such color determination is sometimes referred to as "shade taking"), select a CR of a color that matches the determined color, and perform the restoration. In this case, one color CR is often used for restoration. Meanwhile, in the case where a highly aesthetic restoration is performed so as to faithfully reproduce a color change depending on the tooth site, a plurality of CRs of different colors are stacked to perform restoration in some cases.

The shade taking is generally performed using a color tone sample called a shade guide. There are various shade guides designed to facilitate color determination by the number of color samples and the configuration of the holding device that holds the color samples. Among them, "VITA Classical" (trade name) manufactured by VITA, which includes samples of total of 16 colors (An index including a combination of hue and a mixed index of lightness and saturation, or an index considering hue, lightness, and saturation. Hereinafter, a color specified by such an index is referred to also as a "shade".) and is capable of determining, by comparing the shade guide with the colors of the site to be restored and surrounding teeth, the color of the site to be restored, is the most prevalent (See Patent Literature 1). Also for the CR, those of the above 16 shades using pigment substances and dyestuffs are often available.

However, since the colors slightly differ depending on the type of CR even in the case where the shade is the same, it has been necessary to perform determination by using a shade guide for each CR in order to perform accurate shade taking. Further, in order to determine the color-compatibility of the site to be filled, it is necessary to perform determination after the side to be restored of the tooth is actually filled and cured because the color tone of CR changes before and after curing. In the case where a desired color is not obtained, restoration has been performed again in some cases. In addition, in existing CRs in which color (shade) adjustment has been performed using pigment substances or dyestuffs, high color tone compatibility is exhibited immediately after restoration, but the color changes over time and the appearance of the restored site becomes incompatible with the appearance of the natural teeth after a long period of time in some cases.

Meanwhile, a CR that exhibits high color tone applicability to a teeth of a color tone wider than that of the existing CR by imparting light diffusion properties (Patent Literature 2), and a CR that is capable of controlling the visual color tone without using dyes or pigments and has little discoloration or color change (see Patent Literature 3) have also been proposed.

CITATION LIST

Patent Literature

Patent Literature 1: Japanese Patent No. 6004769
Patent Literature 2: Japanese Patent No. 4895443
Patent Literature 3: Japanese Patent No. 6250245

SUMMARY OF INVENTION

Problem to be Solved by the Invention

The CR described in the Patent Literature 2 is one in which the light diffusion properties are enhanced by adjusting the difference between the refractive index of the organic-inorganic composite filler to be blended and the refractive index of the matrix monomer in which the organic-inorganic composite filler is dispersed to diffuse the light entering the CR cured body, and the effect of blurring the color of the background of the restored object and the contours between the restored object and natural teeth is provided (hereinafter, the CR having such effects will be referred to also as "light diffusion CR". Therefore, the light diffusion CR has features that the colors of tooth to be restored are easily matched, and complicated shade taking and selection of the shade of the composite resin are can be easily performed.

Further, the CR described in the Patent Literature 3 uses a spherical filler having a specified average particle diameter and particle diameter distribution, and expresses a structural color by optical interferences, scattering, or the like by making the refractive index of the spherical filler larger than the refractive index of the resin portion serving as the matrix when cured (hereinafter, such a CR expressing a structural color will be referred to also as a "structural color-based CR"). The structural color-based CR has the following excellent features. That is, the structural color-based CR has excellent features of (1) the problem of the color change with time hardly occurs because no dyestuff or pigment substance is used, (2) it can be colored yellow to red, which is a color similar to that of dentin (depending on the average particle diameter of the spherical filler to be used), and (3) it is easy to match the colors of a tooth to be restored, and a tooth to be restored having a wide range of colors can be restored to achieve the appearance close to the appearance of natural teeth using one type of composite resin without performing complicated shade taking and shade selection of the composite resin because the cured body has appropriate transparency.

However, while these effects in the light diffusion CR and the structural color-based CR (hereinafter, these will be collectively referred to also as "wide-ranging color applicable CR".) are excellent, they cannot be imagined from the existing CR other than the wide-ranging color applicable CR, so that it is difficult for a dentist or the like who does not have the experience of actually using the wide-ranging color applicable CR (hereinafter, he/she will be referred to also simply as "non-use experience dentist or the like") to understand it. For this reason, the current situation is that the wide-ranging color applicable CR is not widely used as expected.

In addition, although all wide-ranging color applicable CRs have a wide applicable range of colors, the color of a tooth to be restored to which a CR of one type of shade can be applied is limited particularly in the light diffusion CR. For this reason, in order to achieve high applicability, it is favorable to select and use a light diffusion CR of a different shade or a structural color-based CR expressing a structural color of a different color depending on the color range of the tooth to be restored. However, there is currently no way to easily check the applicable shade range of these wide-ranging color applicable CRs.

Means for Solving the Problem

The present invention is a demonstration instrument for comparing a tooth restoration condition by a composite resin, including:

a display plate having a display surface capable of holding a plurality of restoring samples side by side; and the plurality of restoring samples that can be held side by side on the display surface, the demonstration instrument being characterized in that each restoring sample constituting the plurality of restoring samples is a restored product obtained by restoring a cavity or a defect part of artificial teeth for restoration using a composite resin, the artificial teeth for restoration being obtained by forming the cavity at a predetermined position of artificial teeth to have a predetermined shape and a predetermined depth, the artificial teeth having predetermined shapes and predetermined hues and color tones, or by providing the defect part having a predetermined shape at a predetermined position of the artificial teeth, each restoring sample has an observation surface having a first surface region and a second surface region, an artificial teeth portion being exposed to the first surface, a restored portion by the composite resin being exposed to the second surface region, the plurality of restoring samples includes (1) a plurality of restoring samples obtained by restoring cavities or defect parts of the artificial teeth for restoration using one type of composite resin having the same composition, hues and/or color tones of surfaces of the artificial teeth for restoration being different from each other, or (2) a plurality of restoring samples obtained by restoring cavities or defect parts of the artificial teeth for restoration using a plurality of composite resins having different compositions, hues and/or color tones of surfaces of the artificial teeth for restoration being the same or substantially the same, and all the restoring samples held side by side on the display surface are disposed so that the observation surface is observable by an observer.

In the demonstration instrument according to the present invention, it is favorable to provide, on the display surface of the display plate and/or a back surface of the observation surface of the restoring sample, a holding means capable of attachably/detachably holding the restoring sample on the display surface.

Further, the second surface region of each of the plurality of restoring samples held side by side on the display surface contains a fluorescent material, and it is favorable that the first surface region contains no fluorescent material, the first surface region contains a fluorescent substance different in type from the fluorescent substance contained in the second surface region, or the first surface region contains a fluorescent substance of the same type as the fluorescent substance contained in the second surface region at a concentration significantly different from the concentration in the second surface region.

A second embodiment of the present invention is a method of checking the restored portion restored by the composite resin of the restoring samples held on the display surface of the demonstration instrument according to the above-mentioned embodiment of the present invention, characterized in that the observation surface of the restoring sample is irradiated with exciting light of the fluorescent material contained in the second surface region to check the restored portion by a difference between light emission states of the first surface region and the second surface region.

A third embodiment of the present invention is artificial teeth for restoration for producing a restoring sample for use in the demonstration instrument according to the present invention, characterized in that the artificial teeth for restoration are formed by forming cavities having predetermined shapes and depths at predetermined positions of artificial teeth having predetermined shapes and predetermined color tones or by providing defect parts having predetermined shapes at predetermined positions of the artificial teeth.

A fourth embodiment of the present invention is a demonstration instrument used to compare a tooth restoration condition by a composite resin, comprising: a display plate having a display surface capable of holding a plurality of the artificial teeth for restoration according to the present invention side by side; and the plurality of artificial teeth for restoration, the demonstration instrument being characterized in that the plurality of artificial teeth for restoration is held on the display surface side by side so that the cavity or the defect part is observable by an observer.

A fifth embodiment of the present invention is a method of evaluating a composite resin, comprising: preparing a plurality of artificial teeth for restoration, cavities or defect parts being formed on the plurality of artificial teeth for restoration, hues and/or color tones of surfaces of the plurality of artificial teeth for restoration being different from each other; and disposing restored products on a display surface to evaluate a range of hues and/or color tones to which the composite resin is applicable, the restored product being obtained by restoring the cavities or the defect parts of the plurality of artificial teeth for restoration with the composite resin.

Advantageous Effects of Invention

There is provided, for a composite resin (CR) having a wide range of applicable colors (shades) (wide-ranging color applicable CR), such as a CR having light diffusion properties and a CR that produces color by means of a structural color, a technology with which an excellent effect, specifically, an increased breadth (number) of applicable shades in comparison to an existing CR other than a wide-ranging color applicable CR, can be achieved.

BRIEF DESCRIPTION OF DRAWINGS

FIG. 1 is a plan view (top view) of a typical demonstration instrument according to the present invention, and shows restored products obtained by simulatively restoring artificial teeth of shades A1 to A3, B1, B2, and C1 according to the present invention using one type of structural color-based CR, which are held side by side on a display surface having a white background of a display plate.

FIGS. 2A and 2B are diagrams for describing a method of checking restored portions according to the second present invention, the upper part showing a state when a demonstration instrument according to the present invention is viewed under natural light, the lower part showing a state when the natural light is blocked and the demonstration instrument is viewed while being irradiated with black light.

MODES FOR CARRYING OUT THE INVENTION

Figure 3A:
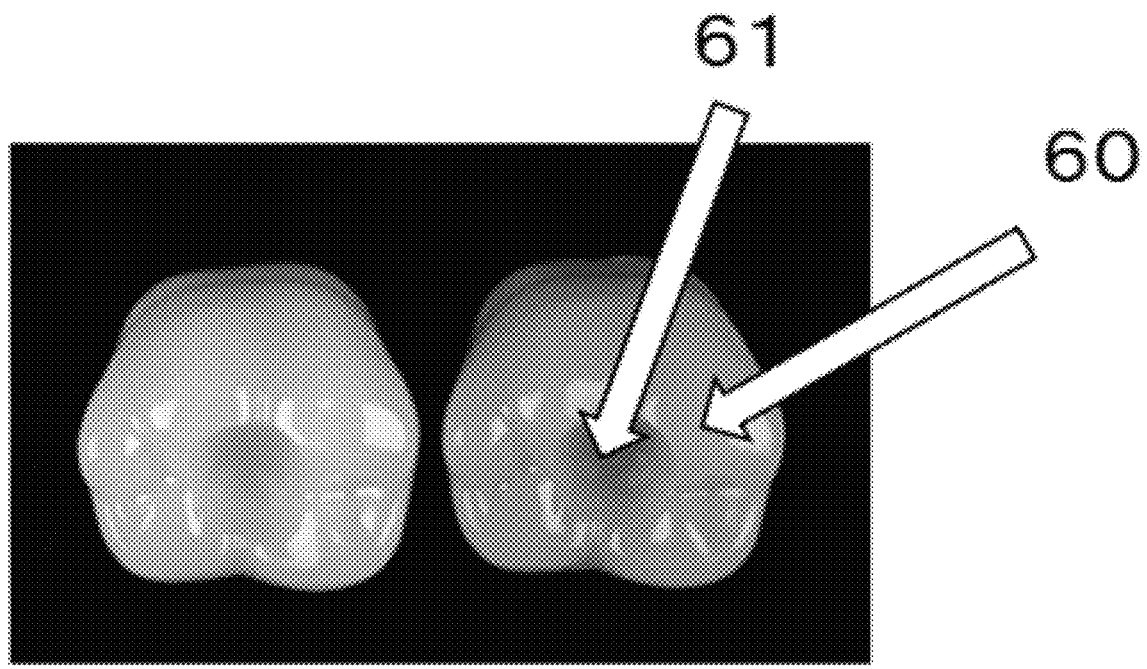
FIG. 3A is a plan view of typical artificial teeth for restoration according to the present invention.

The present inventors considered that the above-mentioned object could be solved by using a demonstration instrument for simply comparing the tooth restoration condition by a CR. That is, for example, by using a demonstration instrument capable of comparing the appearance after restoration for the case where a tooth having an intermediate hue and an intermediate color tone between adjacent shades is (simulatively) restored using an existing CR (using dyestuffs or pigment substances), which has been selected by performing shade taking, and the case where the tooth is (simulatively) restored using a wide-ranging color applicable CR, the above-mentioned excellent effects of the wide-ranging color applicable CR can be easily understood by the non-use experience dentist or the like. As a result, the widespread of such wide-ranging color applicable CRs can be promoted. In addition, for example, by using a demonstration instrument capable of checking the restoration condition of teeth of a wide range of shades (simulatively) restored using a one type of wide-ranging color applicable CR, not only it is useful for the non-use experience dentist or the like to recognize the effect but also the applicable shade range of the wide-ranging color applicable CR can be easily checked, which makes it easy to select a more favorable wide-ranging color applicable CR for actual restoration.

The present invention has been made on the basis of such an idea, and an object thereof is to provide a new demonstration instrument (demonstration tool) that has not been previously known.

The use of the demonstration instrument according to the present invention makes it easier to understand the excellent features of the wide-ranging color applicable CR. That is, in the light diffusion CR, it is easy to understand, by "the effect of blurring the background color of the restored product and the contours between the restored product and natural teeth" resulting from the high light diffusion properties, the features that it is easy to compatible with a tooth to be restored of a wide range of shades and shade taking and selection of the shade of a composite resin can be easily performed. Further, in the structural color-based CR, it is possible to easily understand the excellent features that a color change over time after restoration is unlikely to occur, it is easy to match the colors of a teeth to be restored of a very wide range of shades, and it is possible to restore the tooth to be restored of a wide range of colors to achieve the appearance close to the appearance of natural teeth using one type of composite resin without performing complicated shade taking or shade-selection of a composite resin. Then, as a result, for example, at exhibitions and showcases for potential customers, it is possible to make them recognize the goodness of the wide-ranging color applicable CR through demonstrations using the demonstration instrument according to the present invention and simulated restoration experience using the artificial teeth for restoration according to the present invention. As a result, the widespread of the wide-ranging color applicable CR can be promoted.

In addition, by using the demonstration instrument according to the present invention, it is possible to easily check the applicable shade range of the wide-ranging color applicable CR, and it is easier to select a more favorable wide-ranging color applicable CR for actual restoration.

The above-mentioned operations and advantages of the present invention will be apparent from the following detailed description.

The demonstration instrument according to the present invention is a demonstration instrument for comparing a tooth restoration condition by a composite resin, including: a display plate having a display surface capable of holding a plurality of restoring samples side by side; and the plurality of restoring samples that can be held side by side on the display surface.

Here, the above-mentioned display plate is a plate-like member for holding a plurality of restoring samples, which will be described below in detail, and has a main body and a display surface. The size of the main body of the display plate is appropriately determined depending on the number of restoring samples to be held and the type of arrangement. The display plate usually includes a 3 to 10 cm long, 5 to 15 cm wide and 1 to 3 mm thick rectangular plate, favorably a 4 to 7 cm long, 7 to 10 cm wide, and 1 to 2 mm thick rectangular plate. The material thereof is not particularly limited, and a synthetic resin such as polyethylene, polypropylene, acrylonitrile butadiene styrene (ABS resin), and polycarbonate, or a metal such as a stainless steel plate can be used. However, those formed of a synthetic resin such as polypropylene are favorable for the reason that processing is easy and it is light and does not corrode.

The display surface is a surface capable of holding a plurality of restoring sample side by side, is favorably white for the reason of comparability of color tones, and is favorably black for the reason that a color tone is well reproduced in the oral cavity. Further, the display surface favorably has a caption display portion for displaying a simple explanation (caption) such as the shade of the restoring sample to be held.

The restoring samples are held on the display surface usually by bonding using an adhesive, but a holding means for attachably/detachably holding the restoring samples may be used to hold them. By using such a holding means, the restoring sample to be compared can be appropriately exchanged and held on one display plate, which is convenient to perform comparison and checking from various viewpoints within a short time. Usually, such a holding means is one capable of attachably/detachably holding restoring samples by a set of one installed on the display surface (one holding means) and one installed on the restoring sample (the other holding means). Examples of such a holding mean include a hook-and-loop fastener, a snap button, various one-touch connectors, and a one-touch joint.

Each restoring sample constituting the plurality of restoring sampled used in the demonstration instrument according to the present invention is a restored product obtained by restoring a cavity of artificial teeth for restoration using a composite resin, the artificial teeth for restoration being obtained by forming the cavity at a predetermined position of artificial teeth to have a predetermined shape and a predetermined depth, the artificial teeth having predetermined shapes and predetermined hues and color tones (shades), or by providing the defect part having a predetermined shape at a predetermined position of the artificial teeth, The artificial teeth used for the restored product as the above-mentioned restoring samples are also artificial teeth for restoration according to the present invention, and are not particularly limited as long as they have predetermined shapes and predetermined shades and are obtained by forming a cavity at a predetermined position or they are obtained by providing a defect part having a predetermined shape at a predetermined position. For example, those obtained by cutting acrylic resin teeth or hard resin teeth, which are available as denture base artificial teeth, using a carbide bar or a diamond bar to form the cavity or the defect part can be used.

The material or inner structure of the artificial teeth prior to the formation of the cavity or the defect part is not particularly limited. However, it is favorable to use one having a multilayer structure of a dentine layer and an enamel layer, or the like from the viewpoints that it has an inner structure close to that of natural teeth and more precise evaluation of color tone compatibility can be realized. In addition, in the case where a simulated restoration is performed by a non-use experience dentist or the like to check its quality, it is favorable to use acrylic resin teeth from the viewpoint of cost.

The artificial teeth may be anterior, molar, or other, but it is favorable that the shapes and sizes be the same between the artificial teeth for restoration of the restored products to be compared with each other in terms of being suitable for comparison.

The shape of the cavity or the shape of the defect part only need to be appropriately selected in accordance with the purpose, but it is favorable to select from class I to class V cavity which are classifications of common cavity forms. The formation position, size, and the like only need to be appropriately determined in accordance with the purpose. For example, in a class I cavity, usually, it is favorable to form the cavity or the defect part to have a bottomed cylindrical shape or a bullet shape with a bore diameter of 2 to 5 mmφ, a depth of 1 to 4 mmφ, particularly a bore diameter of 3 to 4 mmφ and a depth of 2 to 4 mm, at a position at the center or substantially the center of the held restored product when viewed from directly above in the case where the demonstration instrument according to the present invention is placed on a horizontal plane with the display plate facing downward. Further, the defect part corresponds to a fracture portion of a tooth, and it is favorable that the defect part is usually formed at a peripheral edge position of the held restored product when viewed from directly above. From the viewpoint of being suitable for comparison, it is favorable that the formation positions, shapes, sizes, and the like of the cavities or the defect parts are the same between the artificial teeth for restoration of the restored products to be compared with each other.

The composite resin (CR) used for restoring the cavity is appropriately determined in accordance with the purpose of comparison. For example, in the case of demonstrating the excellent features of wide-ranging color applicable CR (Case 1) and the case of checking the applicable shades of the wide-ranging color applicable CR (Case 2), the wide-ranging color applicable CR is used. In addition, in the case of performing comparison with the case where (simulative) restoration has been performed using an existing CR other than the wide-ranging color applicable CR in the above-mentioned demonstration (Case 3), the existing CR is also used together.

Then, it is favorable that the plurality of restoring samples includes a plurality of restoring samples represented by the following (1) and a plurality of restoring samples represented by the following (2) in the above-mentioned Case 1 and/or 2 and in the above-mentioned Case 3, respectively.

(1) A plurality of restoring samples obtained by restoring cavities of the artificial teeth for restoration using one type of composite resin having the same composition, hues and/or color tones of surfaces of the artificial teeth for restoration being different from each other.

(2) A plurality of restoring samples obtained by restoring cavities of the artificial teeth for restoration using a plurality of composite resins having different compositions, hues and/or color tones of surfaces of the artificial teeth for restoration being the same or substantially the same.

Incidentally, in the case of performing restoration using the wide-ranging color applicable CR, a restored portion is difficult to visually confirm and is not distinguishable from unrestored artificial teeth in some cases, and there is a possibility that an observer mistakes the restoring sample as a raw artificial tooth and fails to achieve the desired object. In order to prevent inhibit such misidentification, it is favorable that the CR used for restoration is one containing a fluorescent substance. In the case where a restoring sample made using a CR containing a fluorescent material is irradiated with high-energy light (exciting light) such as black light and UV light, which causes the fluorescent material to emit light, the restored portion can be easily checked by the difference in the light emission states (see FIGS. 2A and 2B). Because artificial teeth also contains a fluorescent material in some cases, it is favorable to appropriately determine the type and/or concentration of the fluorescent material contained in the CR depending on the used artificial teeth so that restored portion can be recognized by the above-mentioned high-energy light.

The restoring samples each have an observation surface having a first surface region and a second surface region, an artificial teeth portion being exposed to the first surface, a restored portion by the composite resin being exposed to the second surface region, and are disposed and held side by side on the display surface so that the observation surface can be observed or visually checked by an observer, favorably, the observation surface faces the observer. The method of arranging/disposing a plurality of restoring samples can be freely designed, and suitable arrangement/disposition only needs to be adopted as appropriate in accordance with the object.

For example, in the case where the light diffusion CR is used for the above-mentioned Cases 1 and 2, it is favorable to prepare a restoring sample (referred to also as "the same shade restoring sample") for a "light diffusion CR with a specific shade" whose effects or applicable shade ranges are to be checked, using artificial teeth for restoration having the same shade as the shade, select, in the case where VITA shade guides are disposed in the order of brightness, artificial teeth for restoration having shades (referred to also as "peripheral shades".) of two or more shades before and after the shade (four or more shades in total), prepare restoring samples using these (referred to also as "peripheral shade restoring samples".), and arrange the same shade restoring sample and at least one, favorably four or more, of the peripheral shade restoring samples side by side in order of lightness of the shades. The peripheral shades to be selected at this time do not necessarily need to be consecutive in the order of brightness of the above-mentioned VITA shade guides, and may be selected at appropriate intervals.

Note that the order when the VITA shade guides are disposed in the order of lightness (high lightness->low brightness) is "B1->A1->B2->D2->A2->C1->C2->D4->A3->D3->B3->A3.5->B4->C3->A4->C4".

Specific examples of the favorable arrangement/disposition for the above-mentioned purpose include an example in which when the specific shade (=the same shade) is A2, the same shaded restoring sample in which the artificial tooth for restoration of the shade A2 has been restored with the light diffusion CR of the shade A2 and peripheral shade restoring samples in which artificial teeth for restoration of the shades B1, A1, B2, C1, and A3 have been restored with the light diffusion CR of the shade A2 are prepared, and arranged/disposed in the order of B1->A1->B2->A2 (the same shade restoring sample)->C1->A3.

At this time, in the case where the restoring sample by the light diffusion CR of the shade A2 is disposed in the above-mentioned arrangement in the upper stage (or the lower stage) with the arrangement being in two stages and the restoring sample of the shade A2 by an existing CR (other than the wide-ranging color applicable CR) is disposed in lower stage (or the upper stage) so as to correspond to the upper stage (or the lower stage), the breadth of the applicable shade range of the above-mentioned light diffusion CR can be more realistic.

Further, in the case where the structural color-based CR is used for the above-mentioned Cases 1 and 2, it is favorable to classify the order of lightness of the VITA shade guides into five groups, i.e. group 1: B1->A1->B2, group 2: D2->A2->C1, group 3: C2->D4->A3->D3, group 4: B3->A3.5->B4, and group 5: C3->A4->C4, and make the disposition/arrangement on the basis of these groups. For example, in each group, it is favorable to use the shades A1, A2, A3, A3.5, and A4, which are color samples of the A-based color, as reference shades, prepare a restoring sample ("specified restoring sample") obtained by restoring an artificial tooth for restoration having a shade ("specified reference shade") selected from these five reference shades with a "specific structural color-based CR" whose effects or applicable shade ranges are to be checked, and prepare one or more types of restoring samples (normal restoring sample) obtained by restoring artificial teeth for restoration having one or more types of shades (which may be reference shades other than the specific reference shade.) selected from a group other than the group to which the selected reference shade belongs with the "specific structural color-based CR", and arrange them in the order of brightness. By selecting and arranging artificial teeth for restoration in this manner, it is possible to evaluate the color tone applicability for the artificial teeth for restoration having different lightness, and the breadth of the applicable shades of the above-mentioned structural color-based CR can be more realistic.

Specific examples of the favorable arrangement for the above-mentioned purpose include 3-restoring-sample arrangement in which the specific reference shade is A2 and the restoring samples are arranged in the order of B1->A2->A4 and 7-restoring-sample arrangement in which the specific reference shade is A1 and the restoring samples are arranged in the order of B1->A1->C1->D3->B4->A4->C4.

In the demonstration instrument according to the present invention, an artificial tooth in which a cavity or a defect part is formed, which is restored with a CR, may be used as the individual restoring sample as it is. However, in order to improve the easiness of holding the restoring samples on the display surface of the display plate, the back side (the side to be joined to the display surface) of artificial teeth prior to the restoration or after the restoration may be processed. For example, in order to increase the adhesive area when bonding using an adhesive, a part of the back side may be cut to form a flat portion, or one of the holding means (one installed on the restoring sample) may be installed thereon.

Further, in accordance with the present invention, it is also possible to evaluate the range of hues and/or color tones to which the CR is applicable. Specifically, first, a plurality of artificial teeth for restoration as described above in which cavities or defect parts are formed is prepared, hues and/or color tones of surfaces of the plurality of artificial teeth for restoration being different from each other. Next, these artificial teeth for restoration are disposed on a display surface of a display plate as described above, for example, in the order of brightness. Subsequently, the cavities or defect parts of the plurality of artificial teeth for restoration disposed on the display surface are restored with CRs to be evaluated to prepare a plurality of restored products. Then, the plurality of restored products disposed on the display surface can be visually observed, for example, to evaluate the range of hues and/or color tones to which the CRs are applicable.

The present invention will now be described in more detail with reference to the drawings, but the present invention is not limited to the embodiments shown in these drawings.

FIG. 1 shows a plan view (top view) of a typical demonstration instrument 10 according to the present invention. In the demonstration instrument 10, a total of six restoring samples 50 including restored products obtained by simulatively restoring artificial teeth of shades A1 to A3, B1, B2, and C1 by using one type of structural color-based CR are held side by side on a display surface 30 of a display plate 20. The display surface 30 is white, and the shades of the respective restoring samples 50 are shown in a caption display portion 40.

FIGS. 2A and 2B show a state (a) when the demonstration instrument according to the present invention in which the restoring samples 50 restored with structural color-based CRs containing a fluorescent material are arranged is viewed under natural light, and a state (b) when the natural light is blocked and black light is applied. Although the restored portions 51 restored with the CRs are difficult to recognize in the state (a), the contrast between the restored portion 51 emitting light by fluorescence and an artificial teeth portion 52 becomes clear in the state (b) because the display surface 30 is black, and thus, the position of the restored portion 51 can be clearly confirmed.

Figure 3B:
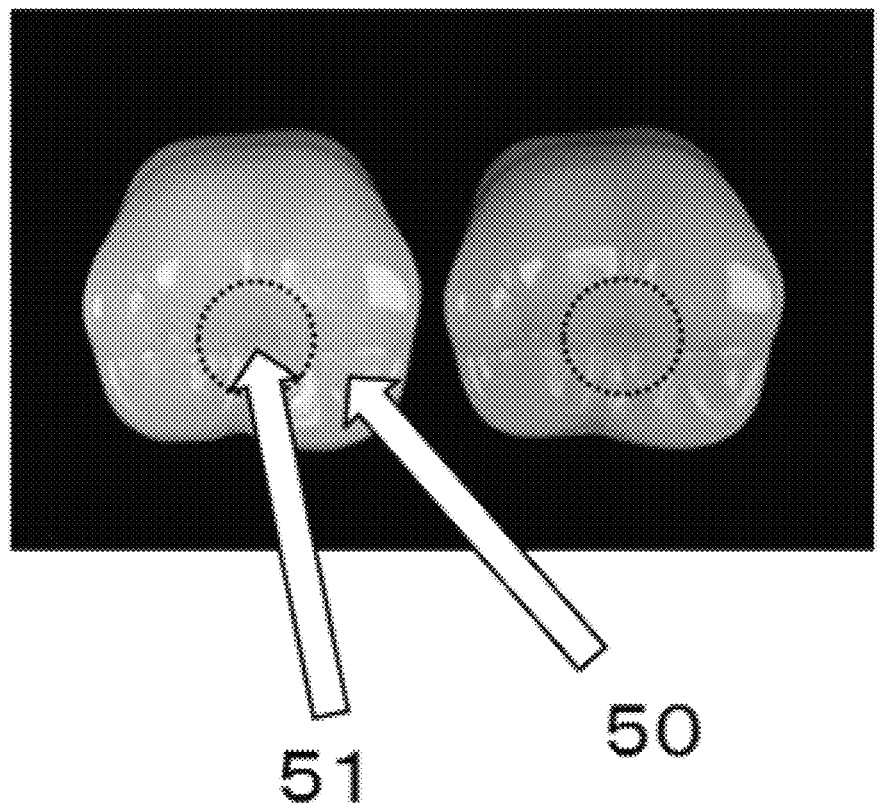
FIG. 3B is a plan view of restored products using the typical artificial teeth for restoration according to the present invention.

FIG. 3A shows a typical artificial tooth for restoration 60 according to the present invention. A cavity 61 is formed on the artificial tooth for restoration 60. FIG. 3B shows the restoring sample 50 manufactured by using the artificial tooth for restoration 60 shown in FIG. 3A. In the restoring sample 50, a restored portion 51 in which the cavity 61 is filled with a CR is formed in a portion surrounded by dotted lines in FIG. 3B.

REFERENCE SIGNS LIST

10 demonstration instrument
20 display plate
30 display surface
40 caption display portion
50 restoring sample
51 restored portion
52 artificial teeth portion
60 artificial teeth for restoration
61 cavity

The invention claimed is:

1. A demonstration instrument for comparing a tooth restoration condition by a composite resin, the demonstration instrument comprising:
   a display plate having a display surface capable of holding a plurality of restoring samples side by side; and
   the plurality of restoring samples that can be held side by side on the display surface,
   wherein each restoring sample of the plurality of restoring samples is
   (a) a restored product obtained by restoring a cavity of an artificial tooth using a composite resin, the cavity having a predetermined position, a predetermined shape, and a predetermined depth, the artificial tooth having a predetermined shape, a predetermined hue, and a predetermined color tone, or
   (b) a restored product obtained by restoring a defect part of an artificial tooth using a composite resin, the defect part having a predetermined shape at a predetermined position of the artificial tooth, the artificial tooth having a predetermined shape, a predetermined hue, and a predetermined color tone,
   wherein each restoring sample of the plurality of restoring samples has an observation surface having a first surface region and a second surface region, an artificial tooth portion of the artificial tooth being disposed in the first surface region, and a restored portion by the composite resin being disposed in the second surface region, the restored portion being the restored cavity or defect part of the artificial tooth,
   wherein the composite resin used to restore the cavities or defect parts of the plurality of restoring samples
   (1) is one type of composite resin having the same composition for all restoring samples of the plurality of restoring samples, where hues and/or color tones of surfaces of the artificial tooth of each restoring sample are different from each other, or
   (2) is a plurality of composite resins having different compositions from each other with respect to the restoring samples of the plurality of restoring samples, where hues and/or color tones of surfaces of the artificial tooth of each restoring sample is the same as that of each other restoring sample, and
   wherein the plurality of restoring samples are disposed on the display surface so that the observation surface of each restoring sample is observable by an observer.

2. The demonstration instrument according to claim 1, wherein a holding means capable of attachably/detachably holding the plurality of restoring samples on the display surface is provided on the display surface of the display plate and/or a back surface of the observation surface of each restoring sample.

3. The demonstration instrument according to claim 1, wherein the second surface region of each restoring sample of the plurality of restoring samples comprises a the composite resin and the composite resin comprises a fluorescent material, and wherein
   1) the first surface region of each restoring sample of the plurality of restoring samples comprises no fluorescent material,
   2) the first surface region of each restoring sample of the plurality of restoring samples comprises a composite resin comprising a fluorescent substance different in type from the fluorescent material of the second surface region, or
   3) the first surface region of each restoring sample of the plurality of restoring samples comprises a composite resin comprising a fluorescent substance of the same type as the fluorescent material of the second surface region at a concentration different from a concentration in the second surface region, whereby a coloring state of the first surface region and a coloring state of the second surface region differ when the observation surface of the respective restoring sample is irradiated with exciting light of the fluorescent material of the second surface region.

4. A method of checking the restored portion restored by the composite resin of each restoring sample of the plurality of restoring samples held on the display surface of the demonstration instrument according to claim 3, wherein the observation surface of each restoring sample is irradiated with exciting light of the fluorescent material of the second surface region to check the restored portion by a difference between light emission states of the first surface region and the second surface region.

5. A demonstration instrument for comparing a tooth restoration condition by a composite resin, the demonstration instrument comprising:
   a display plate having a display surface capable of holding a plurality of restoring samples side by side; and
   the plurality of restoring samples that can be held side by side on the display surface,
   wherein each restoring sample of the plurality of restoring samples is
   (a) a restored product obtained by restoring a cavity of an artificial tooth using a composite resin, the cavity having a predetermined position, a predetermined shape, a predetermined depth, the artificial tooth having a predetermined shape, a predetermined hue, and a predetermined color tone, or
   (b) a restored product obtained by restoring a defect part of an artificial tooth using a composite resin, the defect part having a predetermined shape at a predetermined position of the artificial tooth, the artificial tooth having a predetermined shape, a predetermined hue, and a predetermined color tone,
   wherein each restoring sample of the plurality of restoring samples has an observation surface having a first surface region and a second surface region, an artificial tooth portion of the artificial tooth being disposed in the first surface region, and a restored portion by the composite resin being disposed in the second surface region, the restored portion being the restored cavity or defect part of the artificial tooth,
   wherein the composite resin used to restore the cavities or defect parts of the plurality of restoring samples
   (1) is one type of composite resin having the same composition for all restoring samples of the plurality of restoring samples, where hues and/or color tones of surfaces of the artificial tooth of each restoring sample are different from each other, or
(2) is a plurality of composite resins having different compositions from each other with respect to the restoring samples of the plurality of restoring samples, where hues and/or color tones of surfaces of the artificial tooth of each restoring sample is the same as that of each other restoring sample, and
wherein the plurality of restoring samples are disposed on the display surface so that the observation surface of each restoring sample is observable by an observer,
wherein a shape and size of the artificial tooth of each restoring sample of the plurality of restoring samples is the same as that of the artificial tooth of each other restoring sample of the plurality of restoring samples, and
wherein a position where the cavity or the defect part is formed in the artificial tooth of each restoring sample the plurality of restoring samples is the same as that of the artificial tooth of each other restoring sample of the plurality of restoring samples, and a shape and size of the cavity or the defect part of the artificial tooth of each restoring sample of the plurality of restoring samples is the same as that of the artificial tooth of each other restoring sample of the plurality of restoring samples.

6. The demonstration instrument according to claim 5, wherein a holding means capable of attachably/detachably holding the plurality of restoring samples on the display surface is provided on the display surface of the display plate and/or a back surface of the observation surface of each restoring sample.

7. The demonstration instrument according to claim 6, wherein the second surface region of each restoring sample of the plurality of restoring samples comprises a the composite resin and the composite resin comprises a fluorescent material, and wherein
1) the first surface region of each restoring sample of the plurality of restoring samples comprises no fluorescent material,
2) the first surface region of each restoring sample of the plurality of restoring samples comprises a fluorescent substance different in type from the fluorescent material of in the second surface region, or
3) the first surface region of each restoring sample of the plurality of restoring samples comprises a fluorescent substance of the same type as the fluorescent material of the second surface region at a concentration different from a concentration in the second surface region, whereby a coloring state of the first surface region and a coloring state of the second surface region differ when the observation surface of the respective restoring sample is irradiated with exciting light of the fluorescent material of the second surface region.

* * * * *